(12) United States Patent
Krovi

(10) Patent No.: US 12,488,490 B2
(45) Date of Patent: Dec. 2, 2025

(54) ESTIMATING DISTANCES BETWEEN MULTIPLE POINT IMAGE SOURCES WITH QUANTUM IMAGING

(71) Applicant: RAYTHEON BBN TECHNOLOGIES, CORP., Cambridge, MA (US)

(72) Inventor: Hari Kiran Krovi, Lexington, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 860 days.

(21) Appl. No.: 17/827,568

(22) Filed: May 27, 2022

(65) Prior Publication Data

US 2023/0168084 A1 Jun. 1, 2023

Related U.S. Application Data

(60) Provisional application No. 63/283,957, filed on Nov. 29, 2021.

(51) Int. Cl.
*G06T 7/70* (2017.01)
*G01C 3/08* (2006.01)
*G02B 27/10* (2006.01)

(52) U.S. Cl.
CPC ............... *G06T 7/70* (2017.01); *G01C 3/08* (2013.01); *G02B 27/10* (2013.01); *G06T 2207/20056* (2013.01); *G06T 2207/20076* (2013.01)

(58) Field of Classification Search
CPC ............ G06T 7/70; G06T 2207/20056; G06T 2207/20076; G06T 2207/10056; G06T 7/62; G01C 3/08; G02B 27/10
See application file for complete search history.

(56) References Cited

U.S. PATENT DOCUMENTS

| 7,532,772 B2 | 5/2009 | Brady |
| 7,791,780 B2 | 9/2010 | Munro et al. |
| 8,620,166 B2 | 12/2013 | Guha |

(Continued)

OTHER PUBLICATIONS

A. Sajjad, et al. "Attaining quantum limited precision of localizing an object in passive imaging", Physical Review A, vol. 104, p. 022410, Aug. 2021 (15 pages).

(Continued)

*Primary Examiner* — Tony Ko
(74) *Attorney, Agent, or Firm* — CANTOR COLBURN LLP

(57) ABSTRACT

Method for estimating separation distances between a plurality of image sources in a multi-point source imaging system includes: receiving a plurality of light beams, each from a respective image source and having a quantum state mode; constructing a point spread function (PSF) for light beams specific to a symmetry of the image sources; calculating a quantum Fourier transform on the quantum state mode of the plurality of light beams that achieves a quantum limit in a paraxial approximation regime to estimate separation of image sources at the quantum limit to transform the light beams; detecting the transformed light beams to generate electrical signals from respective transformed light beams; and performing signal processing on the electrical signals to estimate the separation distances between the plurality of image sources.

11 Claims, 4 Drawing Sheets

Optical domain processing to perform the Quantum Fourier Transform

(56) References Cited

U.S. PATENT DOCUMENTS

| | | | |
|---|---|---|---|
| 9,411,140 B2 | 8/2016 | Debarre et al. | |
| 9,514,271 B2 | 12/2016 | Nolte | |
| 9,693,034 B2 | 6/2017 | Lew et al. | |
| 9,874,531 B2 | 1/2018 | Yun et al. | |
| 10,554,312 B2 | 2/2020 | Santra et al. | |
| 10,860,944 B2 | 12/2020 | Zhang et al. | |
| 10,891,555 B2 | 1/2021 | Ashrafi | |
| 11,694,453 B2 | 7/2023 | Sirat | |
| 11,695,551 B2 | 7/2023 | Lukens et al. | |
| 11,892,613 B2 | 2/2024 | Oron et al. | |
| 2008/0137059 A1 | 6/2008 | Piestun et al. | |
| 2011/0194175 A1 | 8/2011 | Dougherty et al. | |
| 2011/0249866 A1 | 10/2011 | Piestun et al. | |
| 2017/0264373 A1 | 9/2017 | Krovi et al. | |
| 2018/0032896 A1 | 2/2018 | Fleischer et al. | |
| 2021/0365825 A1 | 11/2021 | Thornton | |
| 2023/0168084 A1 | 6/2023 | Krovi | |
| 2023/0169673 A1* | 6/2023 | Krovi | G02B 27/10 348/135 |

OTHER PUBLICATIONS

C. Lupo and S. Pirandola, "Ultimate Precision Bound of Quantum and Subwavelength Imaging", Physical Review Letters, vol. 117, p. 190802, Nov. 2016 (5 pages).

C. Lupo, Z. Huang, and P. Kok, "Quantum Limits to Incoherent Imaging are Achieved by Linear Interferometry", Physical Review Letters, vol. 124, No. 8, p. 080503, 2020. (6 pages).

C. Oh, et al., "Quantum Limits of Superresolution in a Noisy Environment" Physical Review Letter, vol. 126, p. 120502, Mar. 2021 (7 pages).

E. Knill, et al., "A scheme for efficient quantum computation with linear optics" Nature, vol. 409, No. 6816, pp. 46-52, Jan. 4, 2001.

J. _Rehacek, et al., "Optimal measurements for quantum spatial superresolution," Physical Review. A, vol. 98, p. 012103, Jul. 2018 (6 pages)2018.

L. J. Fiderer, T. Tufarelli, S. Piano, and G. Adesso, "General Expressions for the Quantum Fisher Information Matrix with Applications to Discrete Quantum Imaging" PRX Quantum, vol. 2, p. 020308, Apr. 2021, (15 pages).

M. Pa_ur, B. Stoklasa, and J. Grover, "Tempering Rayleigh's curse with PSF shaping", Optica, vol. 5, No. 10 / Oct. 2018 / Optica, p. 1177-1180, 2018.

M. Reck, et al. "Experimental Realization of Any Discrete Unitary Operator", Physical Review Letter, vol. 73, No. 1, pp. 58-61, Jul. 1994 (6pages)14.

M. Tsang, "Resolving starlight: a quantum perspective", Contemporary Physics, 2020, vol. 60, No. 4, 279-298 (2019). (21 pages).

M. Tsang, R. Nair, and X.-M. Lu, "Quantum Theory of Superresolution for Two Incoherent Optical Point Sources," Physical Review X, vol. 6, No. 3, p. 031033, 2016 (17 pages).

R. Nair and M. Tsang, "Far-Field Superresolution of Thermal Electromagnetic Sources at the Quantum Limit", Physical Review Letter, vol. 117, p. 190801, Nov. 2016 (5 pages).

S. Ang, R. Nair, and M. Tsang, "Quantum limit for two-dimensional resolution of two incoherent optical point sources," Phys Review A, vol. 95, p. 063847, 2017 (13 pages).

S. Guha, "Structured Optical Receivers to Attain Superadditive Capacity and the Holevo Limit" Physical Review Letters, vol. 106, p. 240502, Jun. 2011, 4 pages.

S. R. P. Pavani, et al., "Three-dimensional, single-molecule fluorescence imaging beyond the diffraction limit by using a double-helix point spread function," Proceedings of the National Academy of Sciences, vol. 106, No. 9, pp. 2995-2999, Mar. 3, 2009.

Z. Dutton, et a., "Attaining the quantum limit of superresolution in imaging an object's length via predetection spatial-mode sorting", Physical Review A, vol. 99, p. 033847, Mar. 2019 (8 pages).

Z. Sisi and J. Liang, "Modern description of Rayleigh's criterion", Physical Review A, vol. 99, p. 013808, 2019 (20 pages).

* cited by examiner (a)          (b)          (c)

ESTIMATING DISTANCES BETWEEN MULTIPLE POINT IMAGE SOURCES WITH QUANTUM IMAGING

CROSS-REFERENCE TO RELATED APPLICATIONS

This patent application claims the benefits of U.S. Provisional Patent Application Ser. No. 63/283,957, filed on Nov. 29, 2021 and entitled "Super-Resolution of Multiple Point Sources," the entire content of which is hereby expressly incorporated by reference.

STATEMENT REGARDING FEDERALLY SPONSORED RESEARCH

This invention disclosure is related to a government contract number HR00112090128. The U.S. Government has certain rights to this invention.

FIELD OF THE INVENTION

The disclosed invention generally relates to image processing and more specifically to quantum image processing for estimating distances between multiple point image sources with quantum imaging.

BACKGROUND

Estimating the distances between multiple image sources are utilized in a variety of applications such as microscopy and astronomy to measure the distances between microscopic object under a microscope or the distances between stars from the received images from the stars. However, estimating the distances between multiple image sources that are close to each other is very difficult mainly because of the image quality received from the image sources. The resolution of imaging systems can be limited by aberration or by diffraction, both of which cause blurring of an image. The interplay between diffraction and aberration can be characterized by the point spread function (PSF), which is the impulse response of a focused optical system. In general, the PSF describes what a single point in the object looks like in the image. In addition to direct measurement techniques, PSF may be estimated (measured) by lens prescription or known parameterized techniques. The narrower the aperture of a lens, the more likely the PSF is dominated by diffraction. In that case, the angular resolution of an optical system can be estimated (from the diameter of the aperture and the wavelength of the light) by the Rayleigh criterion.

Known technique use PSF of a microscope to measure distances and/or sizes of the particles under the microscope, where the optical resolution of the microscope is enhanced or the precision of distance measurements of fluorescent objects is maximized, to enable size (or distance) measurements at molecular dimensions. For example, the Vertico SMI microscope achieves structured illumination by using one or two opposing interfering laser beams along the microscope axis. The object being imaged is then moved in high-precision steps through the wave field, or the wave field itself is moved relative to the object by phase shifts. This results in an improved axial size and distance resolution.

Rayleigh criterion requires two-point sources to be regarded as just resolved when the principal diffraction maximum (center) of the Airy disk (the best-focused spot of light that a perfect lens with a circular aperture can make, limited by the diffraction of light) of one image coincides with the first minimum of the Airy disk of the other. If the angular separation distance is greater, the two points are well resolved and if the distance is smaller, they are regarded as not being resolved. The Rayleigh limit is a classical limit, which states that one cannot accurately resolve multiple point sources that are too close to each other. As explained above, the angular separation must be more than a certain amount.

SUMMARY

In some embodiments, the present disclosure is directed to a method for estimating separation distances between a plurality of image sources in a multi-point source imaging system. The method includes: receiving a plurality of light beams, each from a respective image source and having a quantum state mode; constructing a point spread function (PSF) for light beams specific to a symmetry of the image sources; calculating a quantum Fourier transform on the quantum state of the plurality of light beams that achieves a quantum limit in a paraxial approximation regime to estimate separation of image sources at the quantum limit to transform the light beams; detecting the transformed light beams to generate electrical signals from respective transformed light beams; and performing signal processing on the electrical signals to estimate the separation distances between the plurality of image sources.

In some embodiments, the quantum Fourier transform is an Abelian Fourier transform. The signal processing achieves the classical Cramer-Rao bound. The point spread function may be a collection of delta functions in a Fourier space, or a collection of delta functions in a momentum space. In some embodiments, the image sources are arranged in a circle around a known centroid.

In some embodiments, the signal processing is performed using a maximum likelihood estimation (MLE) that maximizes a posterior probability of obtaining detected signals given a separation distance so that, under a prior probability distribution for the separation distances, observed data is most probable, where a point in parameter space that maximizes the posterior probability is the separation distance. In some embodiments, the signal processing is performed using a Minimum mean squared error estimation method.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

DETAIL DESCRIPTION

In some embodiments, the present disclosure utilizes quantum effects to resolve multiple point sources beyond the two-point sources limit, when the sources are closer than this Rayleigh limit distance. In some embodiments, techniques and processes from quantum information processing such as Fourier transforms and linear optical circuits are utilized to resolve multiple point sources. In some embodiments, point spread function methodology that has also been useful in localizing point sources may be utilized. The better resolution obtained cannot be improved with the framework of quantum mechanics. The point sources must have a known symmetry group. In some embodiments, a linear optical circuit implementation is used to demonstrate super-resolution achievement.

Quantum imaging refers to modal transformations on the light field before detection of the electromagnetic field followed by classical signal processing. The difference between quantum imaging and classical imaging is that in quantum imaging, one can modify the probability distribution obtained after detection by performing quantum operations on the light field. In some embodiments, techniques from quantum computing such as known Abelian Fourier transforms are utilized for quantum imaging that help achieve super-resolution.

The quantum Rayleigh limit states that the accuracy of resolving any number of point sources is given by the Quantum Cramer-Rao bound. For two-point sources, a Hermite-Gauss mode sorter is typically used to manipulate the electromagnetic field before detecting it and then using signal processing to estimate the distances between the plurality of image sources.

Figure 1:
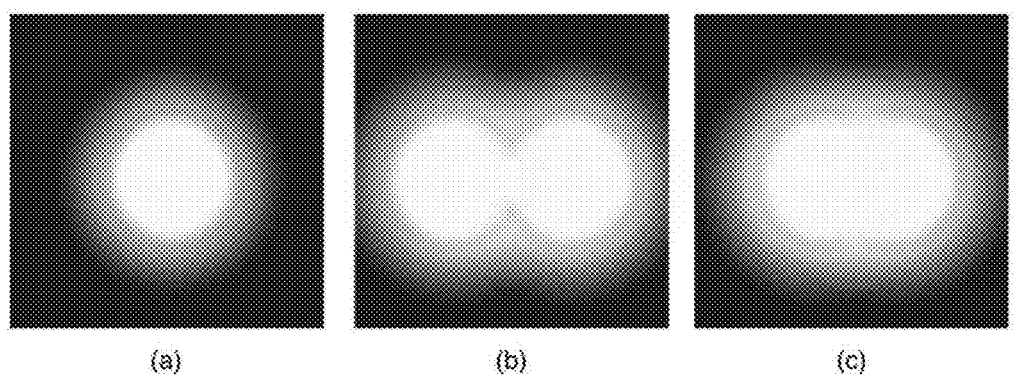
FIG. 1(*a*) illustrates a single source received image, FIG. 1(*b*) shows a two-source image that have a separation distance greater than Rayleigh's limit and FIG. 1(*c*) depicts a two-source image that are below the Rayleigh separation (this is where classical imaging fails and quantum techniques are needed).

An example of points closer than the Rayleigh limit and the problems in classically resolving them is shown in FIGS. 1(a)-1(c). To go beyond this, others have used ad hoc techniques that allow slightly better resolution but not all the way to the quantum limit. FIG. 1(a) illustrates a single source received image, FIG. 1(b) shows a two-source image that have a separation distance greater than Rayleigh's limit and FIG. 1(c) depicts a two-source image that are below the Rayleigh separation (this is where classical imaging fails and quantum techniques are needed).

In some embodiments, the present disclosure uses symmetry in a multiple point images source constellation to construct a quantum measurement that achieves super-resolution in estimation of parameters for the distances between the sources. The approach can be used to estimate multiple parameters simultaneously in symmetric point-source constellations with more than two-point sources using, for example, linear optical circuits. These constellations generalize the estimation of separation between two-point sources considered in seminal work by Tsang et al., in M. Tsang, R. Nair, and X.-M. Lu, "Quantum theory of super resolution for two incoherent optical point sources," *Physical Review X*, vol. 6, no. 3, p. 031033, 2016 ("[1]"), the entire contents of which is herein expressly incorporated by reference.

According to some embodiments of the present disclosure, when there is symmetry, the point spread functions can be chosen so that the transformations that achieve quantum Cramer-Rao bounds can be implemented using linear optical circuits and provide explicit circuits for constellations with several point sources and even extended sources. In some embodiments, the present disclosure proves quantum limits and gives explicit modal transformations for parameter estimation for more than two-point sources.

In some embodiments, the present disclosure constructs a point spread function (PSF) that respects (follows) the symmetry of point sources to the constellation and construct modal transformations that achieve the quantum limit in the paraxial approximation regime, which is a small-angle approximation used in Gaussian optics and ray tracing of light through an optical system. We find that choosing a PSF similar to the one in [2] allows us to use the symmetry of the constellation in two dimensions. The idea that symmetry is useful has already been observed, where a reflection symmetric PSF is considered and the two-dimensional (2D) symmetry has been useful in the construction of the measurement.

An abelian group is a group in which the result of applying the group operation to two group elements does not depend on the order in which they are written. That is, the group operation is commutative. It has also been observed that the symmetry of the two-element abelian group (Z2) and the Fourier transform can be used to estimate separation of two-point sources at the quantum limit. The symmetric and anti-symmetric subspaces can be used to construct the quantum optimal measurement for distance estimation of two-point sources. However, these observations do not use symmetry to go beyond two-point sources. The present disclosure considers a four-point source grid and an N-point source ring, which can be generalized to an extended image source of an annular ring, whose radius is to be estimated.

Figure 2:
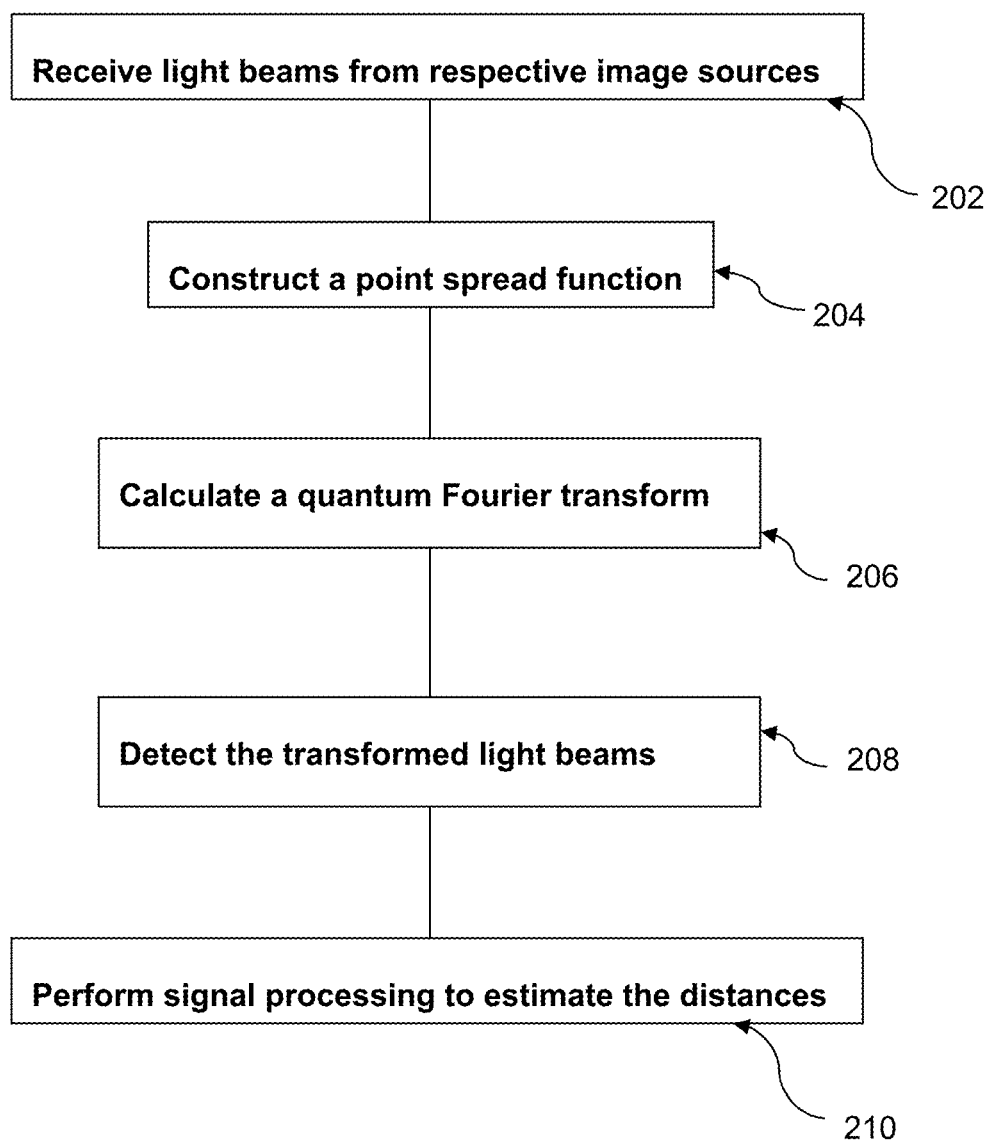
FIG. 2 illustrates an exemplary process flow for estimating distances between multiple point sources, according to some embodiments of the disclosure.

FIG. 2 illustrates an exemplary process flow for estimating the distances between multiple point sources, according to some embodiments of the disclosure. As shown in block 202, multiple light beams are received from multiple point image sources. The image sources have distances of d1, . . . dn from each other and each has a quantum state mode. In some embodiments, the image sources are arranged in a circle around a known centroid. This makes it easier for known signal processing methods to calculate the distance between them.

In block 204, a point spread function (PSF) is constructed for light beams that is specific to a symmetry of the image sources. As mentioned above, when there is symmetry of the image source, the PSF can be chosen so that the transformations that achieve quantum Cramer-Rao bounds can be implemented using linear optical circuits and provide explicit circuits for constellations with several point sources and even extended sources. In some embodiments, the point spread function may be a collection of delta functions in a Fourier space, or a collection of delta functions in a momentum space. The model for the imaging system is defined as the constructed PSF where a modal transformation needed, before detecting the photons.

In block 206, a quantum Fourier transform on the quantum state of the light beams is calculated that achieves a quantum limit in a paraxial approximation regime to estimate separation of image sources at the quantum limit. When the image sources are in the far-field, there is at most one photon in the light modes collected so that one can apply the paraxial approximation.

In block 208, the transformed light beams are detected (e.g., by an optical-to-electrical circuits) to generate electrical signals from respective transformed light beams. These electrical signals now have the information about distances that can be extracted by known signal processing approaches. Without the quantum Fourier transform, the detected electrical signals do not have sufficient information about the separation distances of the multi-image sources.

In block 210, classical signal processing is performed on the electrical signals to estimate the separation distances between the plurality of image sources. For example, a maximum likelihood estimation (MLE), which is a method of estimating the parameters of an assumed probability distribution, given some observed data may be used to estimate the distances between the plurality of image sources. This is achieved by maximizing a likelihood function (e.g.; here the posterior probability of obtaining detected signals given a separation distance) so that, under the assumed statistical model (e.g., here a prior probability distribution for the separation distances), the observed data is most probable. The point in the parameter space that maximizes the likelihood function is called the maximum likelihood estimate (e.g., here the separation distance maximizing the likelihood function).

Other known methods of signal processing, such as, Minimum mean squared error estimator or maximum a posteriori estimation may be used to estimate the separation distances.

This way, the method of the present disclosure greatly enhances a variety of different technologies, such as microscopy and astronomy, especially when multiple image sources are close to each other, because the image quality received from the image sources are blurred.

In some embodiments, the disclosure considers estimation of parameters $\Theta=\{\theta_1 \ldots \theta_k\}$ from a quantum state $\rho$ when there is a symmetry group associated with it i.e., when $\rho$ commutes with the operators of a symmetry group. The basics of quantum estimation theory sates that for a given quantum state $\rho$ parameterized by a set of parameters $\Theta$, the quantum Fisher information matrix (QFIM) F is defined as follows.

$$F_{\mu,\nu}=\text{Re}(Tr(L_\mu L_\nu \rho)), \qquad (2.1)$$

where $\mu$ and $\nu$ belong the set $\Theta$ and $L_\mu$ is the symmetric logarithmic derivative (SLD), which is defined as the solution of $$\frac{d\rho}{d\theta_\mu} = \frac{1}{2}(\mathcal{L}_\mu \rho +_\rho \mathcal{L}_\mu) \qquad (2.2)$$

If the density matrix $\rho$ has the spectral decomposition given by eigenvalues $\lambda_i$ and eigenvectors $|e_i\rangle$, then the SLD can be written as $$\mathcal{L}_\mu = \sum_{m,n:\, \lambda_m+\lambda_n \neq 0} \frac{2}{\lambda_m+\lambda_n} \langle e_m|\frac{\partial \rho}{\partial \theta_\mu}|e_n\rangle |e_m\rangle\langle e_n|. \qquad (2.3)$$

The quantum Fisher matrix contains quantum Fisher information that is a central quantity in quantum metrology and is the quantum analogue of the classical Fisher information. Fisher information is a way of measuring the amount of information that an observable random variable X carries about an unknown parameter $\theta$ of a distribution that models X. Formally, it is the variance of the score, or the expected value of the observed information.

In general, the matrix $\partial \rho/\partial \theta_\mu$ can have support outside the span of $|e_i\rangle$. However, if the eigenvectors are independent of the parameters (as in our examples later), then the support of the derivative is still the span of $|e_i\rangle$. In this case, we see that $$\frac{\partial \rho}{\partial \theta_\mu} = \sum_i \frac{\partial \lambda_i}{\partial \theta_\mu} |e_i\rangle\langle e_i|. \qquad (2.4)$$

Plugging this back into the SLD, we get $$\mathcal{L}_\mu = \sum_n \frac{1}{\lambda_n}\frac{\partial \lambda_n}{\partial \theta_\mu} |e_n\rangle\langle e_n|. \qquad (2.5)$$

This mean that the QFIM $$F_{\mu,\nu} = \sum_n \frac{1}{\lambda_n} \frac{\partial \lambda_n}{\partial \theta_\mu} \frac{\partial \lambda_n}{\partial \theta_\nu}. \qquad (2.6)$$

This is the classical Fisher information of the probability distribution A. Since the classical Cramer-Rao bound (CRB) is achievable, the above shows that when the eigenbasis of $\rho$ is independent of the parameters to be estimated, then one can achieve the quantum Cramer-Rao bound by measuring in the eigenbasis of $\rho$. Also, when $\rho$ has a so-called multiplicity-free representation of a symmetry group associated with it, then it is possible to measure in the eigenbasis of $\rho$. The disclosure uses abelian groups below for simplicity, however, the proof is also true for non-abelian groups.

In quantum mechanics, a density matrix is a matrix that describes the quantum state of a physical system. It allows for the calculation of the probabilities of the outcomes of any measurement performed upon this system. The density matrix is a generalization of the more usual state vectors or wavefunctions, however, state vectors or wavefunction can only represent pure states, but density matrices can also represent mixed states.

In quantum imaging of coherent point sources, the density matrix comes from an ensemble of pure states each corresponding to a specific point source. Suppose that the states that comprise the density matrix have an abelian group symmetry i.e., there is a unitary $U_g$ for every g in the group G such that $|\psi_g\rangle=U_g|\psi_e\rangle$, where $|\psi_e\rangle$ is some state associated with the identity element (this can be any state in the ensemble). The density matrix is given by $$\rho = \frac{1}{|G|} \sum_{g \in G} |\psi_g\rangle\langle\psi_g|. \qquad (2.7)$$

Such a state can be diagonalized using the quantum Fourier transform over the group G. The (unnormalized) eigenstates of $\rho$ turn out to be $$|e_\lambda\rangle = \frac{1}{\sqrt{|G|}} \sum_g \chi^\lambda(g) |\psi_g\rangle, \qquad (2.8)$$

where $X_\lambda(g)$ is an irreducible character evaluated at g. First, we show that these states are orthogonal, even though $|\psi_g\rangle$ may not be orthogonal.

To see this, consider the inner product between two such states.

$$\langle e_\lambda | e_{\lambda'}\rangle = \frac{1}{|G|}\sum_{g,g'} \chi^\lambda(g^{-1})\chi^{\lambda'}(g')\langle \psi_g | \psi_{g'}\rangle. \quad (2.9)$$

Using the group translation property, we can re-write it as $$\langle e_\lambda | e_{\lambda'}\rangle = \frac{1}{|G|}\sum_{g,g'} \chi^\lambda(g^{-1})\chi^{\lambda'}(g')\langle \psi_e|U_g - 1_{g'}|\psi_e\rangle. \quad (2.10)$$

Using orthogonality properties of characters and taking $g^{-1}g=g$, this sum can be shown to be $$\langle e_\lambda | e_{\lambda'}\rangle = \delta_{\lambda,\lambda'}\sum_{g''} \chi^\lambda(g'')\langle \psi_e|U_{g''}|\psi_e\rangle. \quad (2.11)$$

As can be seen above, the states are orthogonal and the norm of each depends on the inner product structure of the states $|\psi_g\rangle$. Now to see that $\rho$ is diagonalized with these states, first let us write $|\psi_g\rangle$ in terms of $|e_\lambda\rangle$ (2.12) can be done as follows.

$$|\psi_g\rangle = \frac{1}{\sqrt{|G|}}\sum_\lambda \chi_\lambda *(g) | e_\lambda\rangle.$$

Using this, we can write the density matrix as $$\rho = \frac{1}{|G|^2}\sum_{g,\lambda,\lambda'} \chi_\lambda *(g)\chi_{\lambda'}*(g^{-1})|e_\lambda\rangle\langle e_{\lambda'}| = \frac{1}{|G|}\sum_\lambda |e_\lambda\rangle\langle e_\lambda|, \quad (2.13)$$

where we have used the orthogonality properties of characters again. The eigenvalues of $\rho$ are $n_\lambda/|G|$, where $n_\lambda = \langle e_\lambda|e_\lambda\rangle$.

For the purpose of modeling the image sources and imaging system, N sources of equal brightness that are all in the XY plane relative to the imaging system are considered as an example, assuming that the point sources are coherent sources of light. In order to be able to describe a linear optical circuit to implement the quantum-optimal measurement using, for example, beamsplitters and phase shifters, it is assumed that there is at most one photon in the light modes collected. This is true when the image sources are in the far-field so that one can apply the paraxial approximation.

The model for the imaging system is defined as a selected point spread function and the modal transformation needed, before detecting the photons. Since we assume that the modes contain at most one photon, only single photon detectors are needed. The selected point spread function is a collection of delta functions in Fourier (or momentum) space. The locations of these delta functions are given by the symmetry of the image sources (which is assumed to be known). For instance, if the sources are two points along the X axis (with an unknown separation distance d to be estimated), then there are two delta functions in momentum space at $p_1$ and $p_2$, which are separated by a known distance p (which can be different from d). In general, the delta functions will be at momenta in 2D momentum space at locations $p^x$, $p^y$, where these XY locations have the same symmetry as the point sources, but with known i I but possibly different values than the locations of the point sources.

This choice of PSF is equivalent to the model of the imaging system defined in C. Lupo, Z. Huang, and P. Kok, "Quantum limits to incoherent imaging are achieved by linear interferometry," *Physical Review Letters*, vol. 124, no. 8, p. 080503, 2020 ("[2]"), the entire contents of which is herein expressly incorporated by reference. In that model, the imaging system has $N_C$ collectors, where each collector is assumed to be a pin-hole that can couple to one spatial mode of light. The collectors are assumed to be in the XY plane. The positions of the collectors are assumed to be $c_i = (u_i, v_i)$ for $i=1, \ldots N_C$. In the paraxial approximation, one can assume that at most one photon arrives in a given temporal mode at the image plane. The quantum state generated due to $N_S$ sources (all assumed to be in the XY plane) in locations $r_i = (x_i, y_i)$ is as follows.

$$\rho = \frac{1}{\sqrt{N_s}}\sum_{i=1}^{N_s} |\psi_i\rangle\langle\psi_i|, \quad (3.1)$$

Where $$|\psi_i\rangle = \frac{1}{\sqrt{N_c}}\sum_{j=1}^{N_c} \exp\left(-\frac{ik}{z_0}r_i \cdot c_j\right)|j\rangle, \quad (3.2)$$

where $z_0$ is the distance between the object plane and the aperture plane.

This model can be derived from the one above with the delta function psf. The quantum state of a single source (in the paraxial regime where at most a single photon is obtained in a time slot) is given by $$|\psi\rangle = \int ds\, \psi(s-r)|s\rangle, \quad (3.3)$$

where r is the position of the source and $\psi(s)$ is the point spread function of the imaging system. Looking at this in the momentum space, we have $$|\psi\rangle = \int dp\, \exp(-ip \cdot r)\tilde{\psi}(p)|p\rangle. \quad (3.4)$$

Now if we choose the Fourier transformed psf $\tilde{\psi}(p)$ to be delta functions at specific points $c_i$ in the momentum space, then it can be seen that this gives the model described above after normalizing by the number of points i.e., $$|\psi\rangle = \sum_j \frac{1}{\sqrt{N}}\exp(-ip_j \cdot r)|j\rangle. \quad (3.5)$$

Choosing the PSF to be as above means that we can mathematically model the resulting quantum states in terms of qudits. The term qudit denotes the unit of quantum information that can be realized in suitable d-level quantum systems. A quantum register that can be measured to N states is identical to an N-level qudit. Qudits are similar to the integer types in classical computing, and may be mapped to (or realized by) arrays of qubits. This allows using known qudit techniques to diagonalize density matrices with symmetry. Specifically, the quantum Fourier transform is the modal transformation that achieves the quantum limit (the quantum Cramer-Rao bound). In addition, in the paraxial regime, since we can assume that there is a single photon in any qudit basis state, one can use a discrete unitary operator techniques of to decompose the modal transformation into a circuit composed of beamsplitters and phase shifters. A discrete unitary operator technique is described in M. Reck, A. Zeilinger, H. J. Bernstein, and P. Bertani, "Experimental realization of any discrete unitary operator," *Phys. Rev. Lett.*, vol. 73, pp. 58-61, July 1994 ("[3]"), the entire contents of which is herein expressly incorporated by reference.

Next, parameters of constellations of sources with symmetry are estimated. Suppose that the sources have a symmetry group G that preserves the density matrix. The action of this group can be thought of as a permutation of the sources. For example, for a constellation of N sources with circular symmetry, the group will be $Z/N_SZ$ of integers modulo N. This group is a subgroup of the orthogonal group which preserves inner products. The unitary representation of this group on the space of momenta is given by permuting the momentum states according to the same group element. In order to be able to do this, we need to assume that the number of momenta is the same as the number of sources and that they are arranged with the same symmetry (e.g., circular) as the sources in the momentum plane. In this situation, if g is any group element that rotates or reflects the sources and takes the source labeled i to the source labeled i, then we have $$|\psi_i\rangle = \frac{1}{\sqrt{N}} \sum_{j=1}^{N} \exp(-ip_j \cdot gr_{i'})|j\rangle \quad (4.1)$$

$$= \frac{1}{\sqrt{N}} \sum_{j=1}^{N} \exp(-igp_j \cdot r_{i'})|j\rangle \quad (4.2)$$

$$= \frac{1}{\sqrt{N}} \sum_{j=1}^{N} \exp(-ip_j \cdot r_{i'})Ug|j\rangle \quad (4.3)$$

$$= Ug|\psi_i\rangle \quad (4.4)$$

This means that the group G is a group of symmetries of the density matrix ρ via the unitary representation U. If this representation is multiplicity-free i.e., it contains each Fourier component exactly once, then one can completely diagonalize the density matrix. Some examples with various types of planar symmetry are provided below.

It is noted that the above formalism works even if the number of momentum points is greater than the number of sources. We choose them to be equal for simplicity of analysis. If the number of delta functions in the PSF are greater than the number of sources, then we need to have all the momenta arranged so that the symmetry of the sources is embedded in them. For instance, if the sources have circular symmetry, then at least N momenta in the PSF must be arranged in a circle.

The transformation to be performed before detection to diagonalize the density matrix is given by the quantum Fourier transform given below.

$$U_{QFT} = \frac{1}{|G|} \sum_g \chi\lambda(g)Ug. \quad (4.5)$$

As mentioned above, in the paraxial regime, one can assume that the qudit basis has only one photon per basis state. This means that the above transformation is a modal transformation and can be decomposed into a circuit with beamsplitters and phase shifters. In some of the examples below, the manner in which this decomposition works are shown.

In a paraxial approximation regime, direct detection of the modes amounts to measuring in the basis of the momenta (labeled U) above). It can be seen from the states above that if one measure in this basis, the probability of getting any particular basis state is 1/N. However, this distribution contains no information about the unknown parameters. The quantum Fisher information of estimating any unknown parameter with this distribution is zero since the distribution is independent of the parameters. This PSF illustrates the stark difference between quantum techniques and classical direct detection.

A 1D reflection symmetry with two-point source is first considered. In this problem, we assume that the centroid of the constellation is known and that the sources are at a distance r from the centroid and we are interested in estimating r. The quantum state is received at the aperture is given by $$\rho = \frac{1}{2}(|\psi_1\rangle\langle\psi_1| + |\psi_2\rangle\langle\psi_2|), \quad (4.6)$$

$$|\psi_1\rangle = \frac{1}{\sqrt{2}}(\exp(-ipr)|0\rangle + \exp(ipr)|1\rangle) \quad (4.7)$$

$$|\psi_2\rangle = \frac{1}{\sqrt{2}}(\exp(ipr)|0\rangle + \exp(-ipr)|1\rangle), \quad (4.8)$$

where we assume that the PSF is chosen with delta functions that are located at p and −p from the origin on the X axis in the image plane. The eigenvalues of the density matrix turn out to be as follow.

$$\lambda_1 = \frac{1}{2}(1+\text{Re}(\langle\psi_1|\psi_2\rangle)), \lambda_2 = \frac{1}{2}(1-\text{Re}(\langle\psi_1|\psi_2\rangle)). \quad (4.9)$$

$$\langle\psi_1|\psi_2\rangle = \cos(2pr), \quad (4.10)$$

Since the eigenvalues are $$\lambda_i = \cos^2(pr), \lambda_2 = \sin^2(pr), \quad (4.11)$$

the QFI can be calculated to be $$QFI = 4p^2. \quad (4.12)$$

Figure 3:
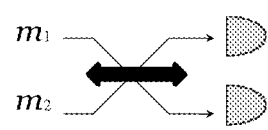
FIG. 3 is a simple linear optical circuit for super-resolution for a two-point source, according to some embodiments of the disclosure.

FIG. 3 is a simple linear optical circuit above achieves super-resolution for a two-point source, according to some embodiments of the disclosure.

This linear optical circuit performs the QFI achieving measurement. The linear optical circuit achieves super-resolution in the estimation of separation distance when the probability distribution obtained at the detector is used for further signal processing that achieves the classical Cramer-Rao bound. As shown, the quantum modes of the lights $m_1$ and $m_2$, are input to a beamsplitter 302, where they are mixed on a 50:50 basis.

This mixing combines the photons in each mode into a quantum superposition over both modes. For instance, if m1 has a single photon and m2 has none, that is, m2 contains the vacuum, then after the 50:50 beamsplitter, the combined state of the two modes is a superposition of the following two states—(a) m1 contains a single photon and m2 contains vacuum and (b) m1 contains the vacuum and m2 contains a single photon. When the modes contain more photons each before the beamsplitter, then they are mixed in a more nontrivial fashion after the beamsplitter. The mixed modes are then detected by respective (optical-to-electrical) detectors 304 and 306 to produce respective analog signals.

Known signal processing, for example, a maximum likelihood estimation (MLE) method is then performed on the analog signals to estimate the distances between the image sources.

Figure 4:
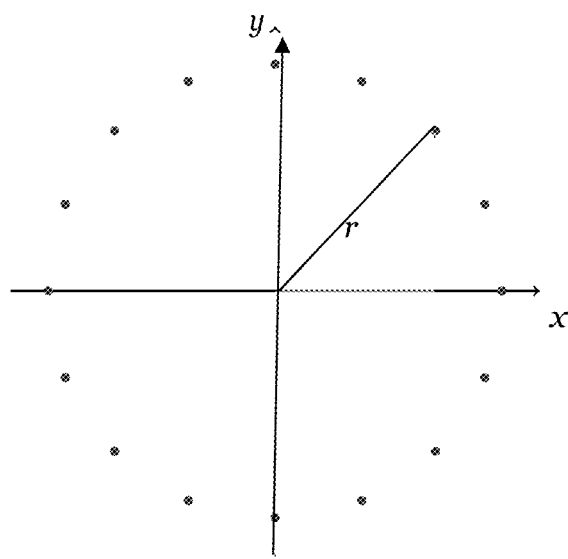
FIG. 4 depicts N point sources arranged in a circle around a known centroid, according to some embodiments of the disclosure.

FIG. 4 depicts N point sources 402 arranged in a circle around a known centroid 404. Each source 402 has a redial distance $r_i$ to the centroid 404. The angular separation $\theta_0$ between two adjacent sources in the object plane is assumed to be known. The sources are assumed to have the same brightness. This is a generalization of the two-point source problem considered in [1]. This problem has a circular symmetry that can be exploited. The density matrix can be written as above in Eq. 3.1. The states $|\psi_i\rangle$ would inherit this circular symmetry if we choose the same number of collectors as the sources. Therefore, we assume $N_S=N_C=N$. In this case, cyclic shift of the collector states j would generate all the states $|\psi_i\rangle$ from one of them. To be more precise, suppose U is a cyclic shift of the collector states taking j to j+1 modulo $N_S$ as follows.

$$U|j\rangle = |j+1 \bmod N\rangle. \quad (4.16)$$

Such a shift operator acting on a source state $|\psi_i\rangle$ would give the following. We assume that addition of indices is modulo N and $R(\theta_0)$ is counter-clockwise rotation of the co-ordinates.

$$U|\psi_i\rangle = \frac{1}{\sqrt{N}} \sum_{j=1}^{N} \exp\left(-\frac{ik}{z_0} r_i \cdot c_j\right) |j+1\rangle \quad (4.17)$$

$$= \frac{1}{\sqrt{N}} \sum_{j=1}^{N} \exp\left(-\frac{ik}{z_0} r_i \cdot R(\theta_0) c_j\right) |j\rangle \quad (4.18)$$

$$= \frac{1}{\sqrt{N}} \sum_{j=1}^{N} \exp\left(-\frac{ik}{z_0} R(\theta_0) r_i \cdot c_j\right) |j\rangle \quad (4.19)$$

$$= \cdot \psi_i + 1\rangle \cdot \quad (4.20)$$

$$\lambda_\ell = \frac{1}{N} \sum_{m=0}^{N-1} \exp(2\pi i m \ell /N) \langle \psi_m | \psi_0 \rangle = \frac{1}{N^2}) \quad (4.21)$$

$$\sum_{m,n=0}^{N-1} \exp(2\pi i m \ell / N) \exp\left(-\frac{ik}{z_0} r_m - r_0\right) \cdot c_n).$$

This symmetry implies that the density matrix can be diagonalize using the Fourier basis. Therefore, measuring in the Fourier basis would achieve the quantum Fisher information. The QFI can be calculated using the eigenvalues of the density matrix, as are as follows:

These can be re-written as follows.

$$\lambda_k = \left| \frac{1}{N} \sum_{n=0}^{N-1} \exp(2\pi i n k/N) \exp(-i p_0 r_0 \cos(2\pi n/N)) \right|^2. \quad (4.22)$$

Writing $\lambda_k = |a_k|^2$, we can write the derivative of $\lambda_k$ with respect to $r_0$ (the unknown radius) as $$\lambda'_k = a_k(a^*_k)' + a'_k a^*_k \quad (4.23)$$

Notice that $a_k$ is just the inverse discrete Fourier transform of the following function.

$$f(n) = \exp(-ipr \cos(n\theta)), \quad (4.24)$$

where $\theta = 2\pi/N$
The derivative of $a_k$ is $$a'_k = \frac{1}{N} \sum_{n=0}^{N-1} \exp(ink\theta) \exp(-ipr \cos(n\theta))(-ip \cos(n\theta)), \quad (4.25)$$

which is the inverse Fourier transform of the function f(n). Now the QFI is given by $$QFI = \sum_k \frac{1}{\lambda_k}(\lambda'_k)^2 = \sum_k \frac{4}{\lambda_k}|a'_k|^2|a_k|^2 = \sum_k 4|a'_k|^2. \quad (4.26)$$

By Parseval's theorem, the QFI becomes $$QFI = \sum_n \frac{4}{N}|f'(n)|^2 = \frac{4p^2}{N} \sum_n \cos^2(n\theta). \quad (4.27)$$

This can be evaluated to be $$QFI = 2p^2 \sum_n \frac{1}{N}(1 + \cos(2n\theta)) = \quad (4.28)$$

$$2p^2 \sum_n \frac{1}{N}(1 + \frac{1}{2}(\exp(2 in \theta) + \exp(-2 in \theta)).$$

Now we have that the sum over each exponential is $$\sum_n \frac{1}{N} \exp(\pm 2 in \theta) = \begin{cases} 1 & \text{if } N = 2 \\ 0 & \text{if } N > 2 \end{cases}. \quad (4.29)$$

Therefore, the QFI of estimating r turns out to be $$QFI = \begin{cases} 4p^2 & \text{if } N = 2 \\ 2p^2 & \text{if } N > 2 \end{cases}. \quad (4.30)$$

Figure 5:
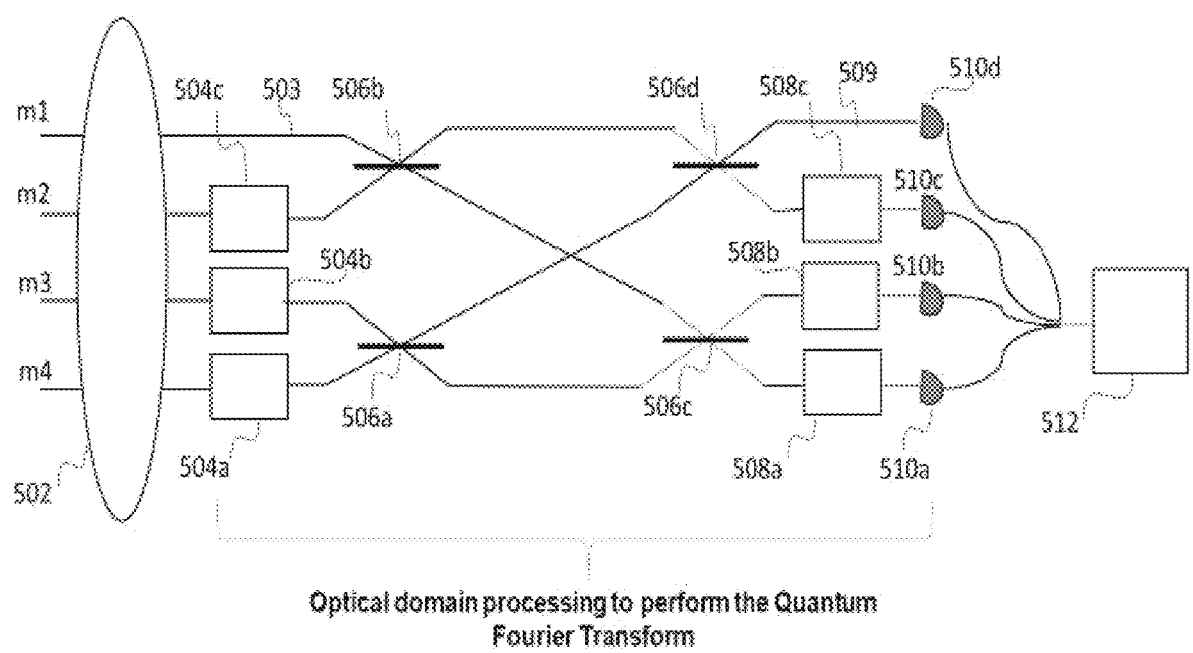
FIG. 5 is a simple linear optical circuit for super-resolution for an m-point source, according to some embodiments of the disclosure.

FIG. 5 is a simple linear optical circuit for super-resolution for an m-point source, according to some embodiments of the disclosure. Although only four point sources are shown, the analysis is applicable to multi-point sources, as explained above. The linear optical circuit estimates the radius of a circularly symmetric configuration of N-point sources (N=4 is shown for simplicity). The input light modes are labeled $m_1$ through $m_4$ and the beamsplitters 506a, 506b, 506c and 506d are all 50:50 beamsplitters. The square boxes are phase shifters with the phase labeled inside, where $\omega N = e^{2\pi i/N}$. Reference [3] above proves that the number of phase shifters is a maximum of 2*(N−1) and the total number of beamsplitters for the optical circuit is a maximum of N*(N−1)/2.

As shown, an aperture 502 receives a plurality of light beams with modes m1, m2, m3 and m4, respectively and produces a point spread function (PSF) from the plurality of light beams. In some embodiment, the aperture 502 is a high numerical aperture (NA) objective lens to produce the three-dimensional diffraction pattern of light as the PSF. The light beams then enter to a plurality of (e.g., N−1) optical phase shifters 504a-504c to shift the light modes based on a quantum Fourier Transform. For example, optical phase shifter 504c takes the light mode m2 and shifts it by ωN, where ωN=$e^{2\pi i/N}$. (i the complex number). Similarly, phase shifter 504b takes the light mode m3 and shifts it by $\omega^2 N$, phase shifter 504a takes the light mode m4 and shifts it by $\omega^3 N$. The phase shifting of the light beams is part of performing a quantum Fourier transform on the light modes m1-m4.

Pairs of the phase shifted light beams are then input to respective beamsplitters (e.g., N*(N−1)/4) 506a and 506b to mix the respective light modes for a quantum superposition of the respective pairs of the might modes. As explained above with respect to FIG. 3, this mixing combines the photons in each mode into a quantum superposition over both modes.

However, one of the light beams, for example, light beam 503 is not phase-shifted and is directly input to beamsplitter 506b, as required by the quantum Fourier transform. The outputs of the phase shifters 504a and 504b are input to beam splitter 506a and the output of the phase shifter 504 and light beam 504 are input to beam splitter 506b. As required by quantum Fourier transform, the mixed modes outputs of the beamsplitters 506a and 506b are alternatively input to beamsplitters 506c and 506d to perform further mixing of the mixed mode outputs of the beamsplitters 506a and 506b. For example, one output of the beamsplitter 506a is input to the beamsplitter 506d, while the other output is input to the beamsplitter 506c. Similarly, one output of the beamsplitter 506b is input to the beamsplitter 506d, while the other output is input to the beamsplitter 506c.

The outputs of the beamsplitters 506c and 506d are then phase shifted again, as part of performing the quantum Fourier transform. For example, optical phase shifter 508c takes the mixed light mode from beamsplitter 506d and shifts it by ωN, phase shifter 508b takes the mixed light mode from beamsplitter 506c and shifts it by $\omega^2 N$, and phase shifter 508a takes the light mode output from beamsplitter 506c and shifts it by $\omega^3 N$ to accomplished the quantum Fourier trans form of the input light beams m1-m4.

Now that the quantum Fourier transform is performed on the input light modes m1-m4 in the optical domain, the resulting transformed light modes are detected by detectors 510a, 510b, 510c and 510d, respectively to convert them to analog electrical signals. In some embodiments, the detectors are each an optical-to-electrical converters such as photodiodes or photo-transistor circuits. These analog signals include the information about the separation distances that can be extracted by known signal processing approaches. Without the quantum Fourier transform, the detected electrical signals do not have sufficient information about the separation distances of the multi-image sources.

Known signal processing is then performed on the analog signals to estimate the distances between the image sources, by a signal processing circuit 512. For example, a maximum likelihood estimation (MLE) may be used to estimate the distances between the plurality of image sources. The signal processing achieves the classical Cramer-Rao bound. Signal processing circuit 512 may comprise of a processor and related circuitry, an analog-to-digital converter and related memory to perform the MLE process and output the estimated distances between the image sources.

In some embodiments, the axis and the origin may be misaligned. For example, consider two-point sources off-axis that are at locations (x, y) and (−x, −y). Here the goal is to estimate the two parameters x and y or equivalently, the radius r and the angle θ. The symmetry in this case is still independent of the parameters. We pick the delta functions in momentum space at p and −p on the X axis as in the previous example. The density matrix is given by $$p = \frac{1}{2}(|\psi_1\rangle\langle\psi_1| + |\psi_2\rangle\langle\psi_2|), \quad (5.1)$$

where $$|\psi_1\rangle = \frac{1}{\sqrt{2}}(\exp(irp\cos\theta)|0\rangle + \exp(-irp\cos\theta)|1\rangle), \quad (5.2)$$

$$|\psi_2\rangle = \frac{1}{\sqrt{2}}(\exp(-irp\cos\theta)|0\rangle + \exp(irp\cos\theta)|1\rangle). \quad (5.3)$$

This shows that interchanging the states |0⟩ and |1⟩ is a symmetry of the density matrix since it interchanges |ψ₁⟩ and |ψ₂⟩. This symmetry implies that the eigenvectors of the density matrix are $$|+\rangle = \frac{1}{\sqrt{2}}(|0\rangle + |1\rangle) \quad (5.4)$$

$$|-\rangle = \frac{1}{\sqrt{2}}(|0\rangle - |1\rangle). \quad (5.5)$$

The corresponding eigenvalues turn out to be $$\lambda_+ = \cos^2(rp\cos\theta) \quad (5.6)$$

$$\lambda_- = \sin^2(rp\cos\theta). \quad (5.7)$$

We can calculate the quantum Fisher information of estimating the separation distance using the eigenvalues. This turns out to be $$QFI = 4p^2 \cos^2(\theta) \quad (5.8)$$

This shows that for any fixed misalignment θ, super-resolution still holds. If instead of picking the psf as delta functions at p and −p, we had picked them to be at radius p and angle $\theta_0$, then the QFI of estimating separation would become $$QFI = 4p^2 \cos^2(\theta - \theta_0). \quad (5.9)$$

Therefore, an initial guess (based on direct detection using some of the photons) can increase the super-resolution constant and bring it closer to $4p^2$.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended drawings and claims.

The invention claimed is:

1. A method for estimating separation distances between a plurality of image sources in a multi-point source imaging system, the method comprising:
   receiving a plurality of light beams, each from a respective image source and having a quantum state mode;
   constructing a point spread function (PSF) for light beams specific to a symmetry of the image sources;
   calculating a quantum Fourier transform on the quantum state mode of the plurality of light beams that achieves a quantum limit in a paraxial approximation regime to estimate separation of image sources at the quantum limit to transform the light beams;

detecting the transformed light beams to generate electrical signals from respective transformed light beams; and performing signal processing on the electrical signals to estimate the separation distances between the plurality of image sources.

2. The method of claim 1, wherein the quantum Fourier transform is an Abelian Fourier transform.

3. The method of claim 1, wherein the signal processing achieves the classical Cramer-Rao bound.

4. The method of claim 1, wherein the point spread function is a collection of delta functions in a Fourier space.

5. The method of claim 1, wherein the point spread function is a collection of delta functions in a momentum space.

6. The method of claim 1, wherein the image sources are arranged in a circle around a known centroid.

7. The method of claim 1, wherein the signal processing is performed using a maximum likelihood estimation (MLE) method.

8. The method of claim 7, wherein the MLE method maximizes a posterior probability of obtaining detected signals given a separation distance so that, under a prior probability distribution for the separation distances, observed data is most probable.

9. The method of claim 8, wherein a point in parameter space that maximizes the posterior probability is the separation distance.

10. The method of claim 1, wherein the signal processing is performed using a Minimum mean squared error estimation method.

11. The method of claim 1, wherein the signal processing is performed using a maximum a posteriori estimation method.

* * * * *